Figure 1:
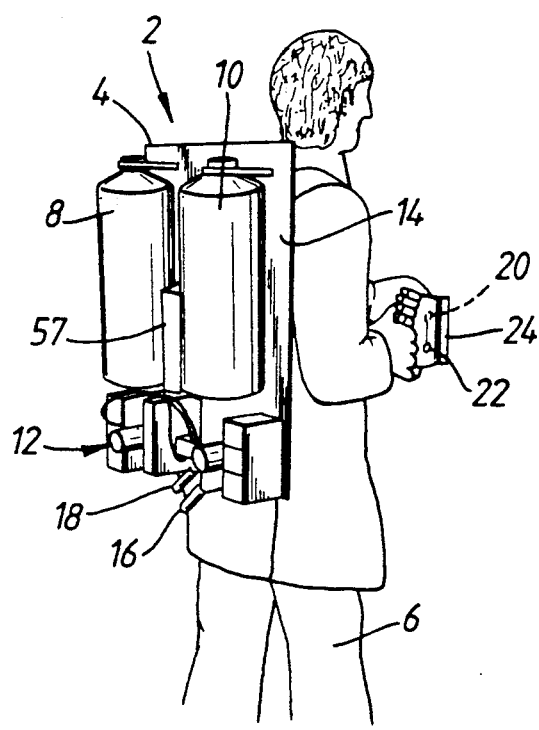
Figure 2:
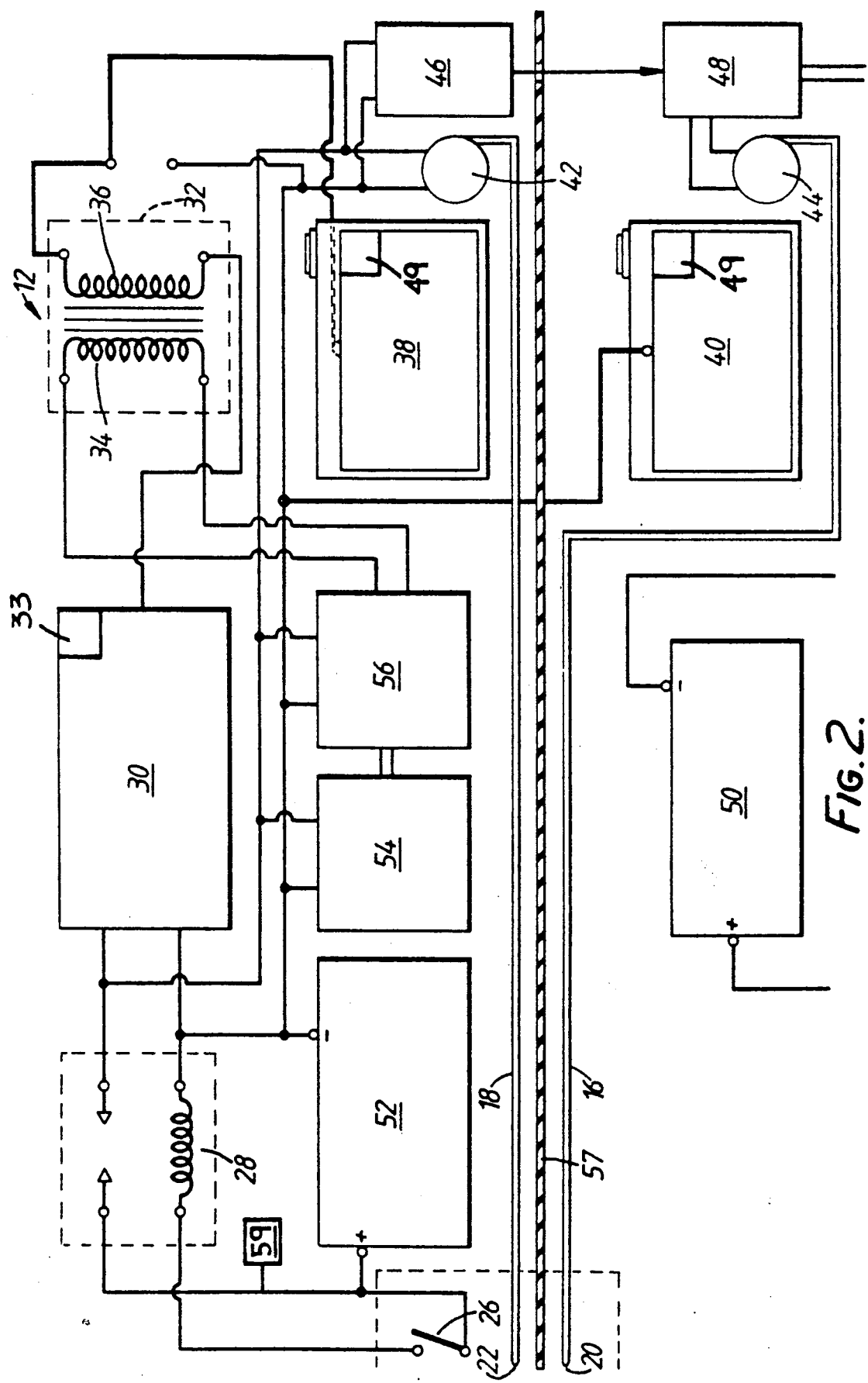

United States Patent [19]
Wainwright et al.

[11] Patent Number: 5,052,628
[45] Date of Patent: Oct. 1, 1991

[54] APPARATUS FOR ELECTRICALLY CHARGING LIQUID DROPLETS FOR USE IN THE STIMULATION OF PLANT GROWTH AND/OR THE CONTROL OF INSECTS

[75] Inventors: Basil E. Wainwright, Yardley Wood, England; Terence O. McGrath, New York, N.Y.

[73] Assignee: Novatech Energy Systems, Inc., New York, N.Y.

[21] Appl. No.: 300,362

[22] Filed: Jan. 23, 1989

[30] Foreign Application Priority Data

Jan. 25, 1988 [GB] United Kingdom ............... 8801602

[51] Int. Cl.$^5$ .............................................. B05B 5/00
[52] U.S. Cl. ..................................... 239/690; 239/691
[58] Field of Search ............... 239/690, 690.1, 691, 239/695, 696, 704, 708

[56] References Cited

U.S. PATENT DOCUMENTS

| | | | |
|---|---|---|---|
| 3,495,779 | 2/1970 | Renner et al. | 239/690 X |
| 3,795,839 | 3/1974 | Walberg | 239/691 X |
| 4,275,846 | 6/1981 | Coffee | 239/690 |
| 4,356,528 | 9/1982 | Coffee | 118/626 X |
| 4,381,533 | 4/1983 | Coffee | 239/696 X |
| 4,467,961 | 8/1984 | Coffee et al. | 239/695 X |
| 4,489,894 | 12/1984 | Marchant et al. | 239/693 |
| 4,664,315 | 5/1987 | Parmentar et al. | 239/690 X |
| 4,682,735 | 2/1987 | Mommsen | 239/690 |
| 4,703,891 | 11/1987 | Jackson et al. | 239/691 X |
| 4,737,887 | 4/1988 | Thome | 239/691 X |

FOREIGN PATENT DOCUMENTS

| 2143153 | 2/1985 | United Kingdom | 239/704 |
|---|---|---|---|
| 2205052 | 11/1988 | United Kingdom | 239/691 |

Primary Examiner—Andres Kashinow
Assistant Examiner—Lesley Morris
Attorney, Agent, or Firm—Roylance, Abrams, Berdo & Goodman

[57] ABSTRACT

Apparatus (2) for electrically charging liquid droplets for use in the stimulation of plant growth and/or the control of insects, which apparatus (2) comprises spray means (16,18:20,22) for spraying at least one spray of liquid from the apparatus (2), and electronically operated liquid-charging means (12) for causing the liquid to be electrically charged in such a manner that liquid droplets constituting the spray are able to retain their charge until earthed during use of the apparatus (2).

8 Claims, 2 Drawing Sheets

APPARATUS FOR ELECTRICALLY CHARGING LIQUID DROPLETS FOR USE IN THE STIMULATION OF PLANT GROWTH AND/OR THE CONTROL OF INSECTS

This invention relates to apparatus for electrically charging liquid droplets for use in the stimulation of plant growth and/or the control of insects. The liquid droplets will usually be water droplets but other liquid droplets can be employed if desired.

The use of electricity to stimulate the growth of plants is well known, and it is established that increased crop harvests can be achieved by applying electrical current to plants. A synopsis of much of the available literature is given in J. Biol. Phys. Vol.5, 1977 in an article entitled Electroculture by Herbert A. Pohl. Whilst the use of electricity to stimulate plant growth is well known, practical apparatus for enabling the plants to be treated on a commercial basis is not available.

In addition to the above problem, there is another problem relating to the growth of plants. This problem involves the use of chemical insecticides in order to control the adverse affects that many insects have on plants. The insects may kill the plants or stunt their growth and many people regard the use of chemical insecticides as essential in order to stop various types of insects from killing or damaging various types of plants in farms, gardens and horticultural establishments. However, many people are seriously concerned about the damage that the chemical insecticides may do. The chemical insecticides enter the entire ecology system so that, for example, the use of non-selective chemical insecticides may be effective to kill insects that do not harm plants and that have a beneficial presence on the ground. Also, there is the possibility of food grown with the use of chemical insecticides retaining the chemical insecticides so that persons eating the food may receive harmful doses of the chemical insecticides.

It is an aim of the present invention to reduce the above mentioned problems.

Apparatus for electrically charging liquid droplets for use in the stimulation of plant growth and/or the control of insects, which apparatus comprises two liquid reservoir means, spraying means for spraying at least one spray of liquid from the liquid reservoir means, and electronically operated liquid-charging means for causing the liquid to be electrically charged in such a manner that liquid droplets constituting the spray are able to retain their charge until earthed during use of the apparatus: the electronically operated liquid-charging means including first oscillator means for driving an extreme high tension circuit for affording an extreme high tension voltage output; transformer means having a primary winding driven by the extreme high tension voltage output, the transformer means having a first output on a secondary winding of the transformer means driven by a d.c. inverter means, and a secondary output on the secondary winding of the transformer means which is connected to one of the liquid reservoir means; an earth connection which is for the liquid-charging means and which is connected to one of the reservoir means; and second oscillator means which operates in parallel with the first oscillator means.

The apparatus operates to cause the liquid droplets to retain their charge and the liquid droplets may be such that they remain polarized in their magnetic field until they become earthed by contact with a plant or an insect. The liquid-charging means may be effective to cause ion movement in the liquid, thereby vastly increasing the conductivity of the liquid and the amount of electrical charge that the individual liquid droplets are able to assimilate and retain.

The apparatus of the invention may be arranged such that the liquid-charging means charges the liquid with varying degrees of current so that the apparatus can operate in a plant growth stimulating mode or in an insect killing mode, as may be desired. In the insect killing mode, the apparatus of the invention will usually be operated such that the amount of applied electrical charge is not sufficient to harm bird life. As will be appreciated, the use of the apparatus of the invention to stimulate plant growth and/or to control insects is such that the apparatus is able to operate in a manner that is non-toxic to humans. The apparatus can thus operate as a non-toxic, non-chemical insecticide that is able to stimulate plant growth.

The plants that may be treated with the apparatus of the invention may generally be all vegetable life, including plants grown for food, plants grown for their appearance, trees, bushes and shrubs. The plants may thus include crops such for example as wheat, barley, maize, rice and potatoes. The use of the apparatus of the invention may enable increased crop yields, which is especially important for crops such as the above mentioned wheat, barley, maize, rice and potatoes which are widely eaten as a main part of human diet.

The insects that may be killed or controlled using the apparatus of the invention are generally any of those type of insects found in farms, in gardens or in other horticultural establishments, and that eat or otherwise attack plants. The insects may be all classes of arthropods, small invertibrates, and any of the small boring and creeping animals including terestrial gastropods and the like that are considered by horticulturists and farmers to be destructive. Examples of insects are thus those generally known as slugs, beetles, mites, aphids, such as greenfly and blackfly, caterpillars and locusts. The insects can be killed or controlled at all stages of their life cycle, for example as eggs, larvae and adults.

The apparatus of the invention will usually include liquid reservoir means.

The spray means may be a pumping arrangement. Alternatively, the spray means may be a pressurised gas arrangement. The pressurised gas arrangement may use compressed air or any other desired and suitable gas.

For use of the apparatus in its biostimulation plant growth mode, the liquid-charging means may be effective to provide the liquid droplets with 0.25–0.75 mA of d.c. and preferably 0.5 mA of d.c. For use of the apparatus in its insect killing mode, the liquid-charging means may be effective to provide the liquid droplets with 2–5 mA of d.c.

The apparatus of the invention may be arranged to be portable so that persons can spray crops and/or insects as and where desired. Advantageously, the portable apparatus is constructed as a back pack for wearing on the back of an operator. The apparatus may also be constructed in the form of a small motorised vehicle, for example, a hand cart. Alternatively, larger self-propelled vehicles can be employed. Still further, the apparatus may be in the form of a towed vehicle, for example a vehicle which is towed behind a tractor for use on farms. Further, the apparatus can be provided in an airborne vehicle such for example as a small low flying aircraft, an auto-giro or a helicopter. If desired, the apparatus can be arranged to be static in a growing area and to spray that area periodically.

The apparatus of the invention may be provided with adjuster means for adjusting spray pressure and/or spray orifice size for enabling the liquid to be sprayed at varying distances, with varying angles of spray and with varying sizes of liquid droplets.

The liquid-charging means may include a protective overload device. The protective overload device may be a spark overload gap arrangement.

The apparatus of the invention may be arranged to spray a single spray of the liquid, two sprays of the liquid, or more than two sprays of the liquid. With two sprays of the liquid, the liquid droplets in one spray will usually be positively charged, whilst the liquid droplets in the other spray will usually be negatively charged. With such a two spray arrangement, an electrical circuit will be completed by ground and the plants or insects being sprayed. The two sprays could be sprayed, for example, from opposite wings of a low flying aircraft. With more than two sprays, the liquid droplets in the spray may be electrically charged as may be desired and appropriate. With a single spray, the liquid droplets may be positively or negatively charged, and an operator will then usually be provided with circuit completing means such for example as a ground probe and a retractible earth ground wire attached to the probe, or a heavy earthing weight which is moved over the ground with the operator.

The first and second reservoirs may be first and second tanks. The tanks may be of cylindrical construction.

The transformer means may be designed and constructed to give a.c. components for an insect controlling mode of from 10–500,000 volts.

The d.c. inverter means may be designed and constructed to give d.c. components which vary from 5,000 to 500,000 volts.

The first oscillator means may operate at 73.2 megacycles and the second oscillator means may operate at 1 kilocycle.

The apparatus may be arranged for having two power sources. The two power sources may be effective to control the liquid output from the two reservoirs, there normally being a control valve situated on each reservoir for controlling the output of the liquid. It will be appreciated that if a single power source is employed with two reservoirs, a short circuit may result in the high tension side of the apparatus.

Usually, the apparatus of the invention will include isolater means for isolating an operator from the high voltage of the liquid-charging means which, as mentioned above, may be 500,000 volts.

The isolater means is advantageously a photo-coupling device for ensuring that an operator cannot be connected directly to the high voltage part of the apparatus of the invention. The photo-coupling device may be a flashlight bulb operated by a 1½ volt battery connected to an operator button. When the operator button is depressed by the operator, the battery is effective to light a bulb which is detected by a pair of optical sensors. The optical sensors may be separated by a gap of, for example, 150 mm. The optical sensors, consequent upon sensing the light from the bulb, are then effective to drive appropriate amplifiers and relays which result in the water being sprayed from the two reservoirs.

When the two power sources are employed, one power source is effective to drive the two oscillator means and one of the valves on one reservoir, and the other power source is effective just to drive the other valve on the other reservoir.

The power sources are preferably re-chargeable cells.

The liquid-charging means may be caused to operate such that there is provided a negative d.c. carrier, for example of 10,000 volts at 200 mA, plus a high frequency saw tooth generator giving a low voltage of, for example, 1500 volts, plus an ordinary sine wave effective to operate at 180–260 Kv. The direct current and the high frequency voltage are employed in combination as one can normally not use an electric current with liquids. With water as the liquid, the sine wave is used with the high frequency current to overcome circuit resistance where droplet formation of water dissociates into hydrogen and oxygen.

The apparatus of the invention may include flow measuring means for measuring the rate of flow of the electrically-charged liquid.

The apparatus of the invention may also include operating time recording means for recording the amount of time that the apparatus of the invention has been in operation. The operating time recording means can be used to indicate when the apparatus needs servicing. The operating time recording means is also very useful if the apparatus is hired out so that a hire charge can then be made in proportion to the time of use.

The apparatus of the invention may be used for only relatively brief periods of time to kill insects. The apparatus will usually be used for longer periods of time in order to stimulate plant growth. It has been found that many plants respond positively to the electrically charged liquid such that they grow faster. The increased growth appears to be due to the electrically charged liquid causing some form of biostimulation in the plants. The biostimulation could be due to magnetic effects from the electrical current.

Usually, the liquid will be water. Other liquids may however be employed.

Various chemicals may be added to the liquid. Thus for example, liquid fertilisers and nutrients may be added so that the sprayed liquid can also contain chemicals especially suitable for stimulating and/or maintaining plant growth. Examples of such chemicals that may be added are calcium, potassium and magnesium. Systematic absorption of fertilisers and nutrients through plant foliage may be especially advantageous where the plant roots will not take up the fertiliser or nutrient. The liquid may also be treated with systematic insecticides which will be absorbed by the plant foliage and which may be fatal to insects who subsequently eat the foliage.

The present invention also provides a liquid spray comprising a plurality of droplets, the droplets being such that they are each provided with an electrical charge which is retained in the droplets until the droplets are earthed.

Preferably, the droplets are negatively charged. For plant growth stimulation, better results may be obtained when the droplets are negatively charged than when they are positively charged. If desired however, the droplets can be positively charged.

The present invention also provides two liquid sprays, each spray comprising a plurality of droplets, the droplets in each spray being such that they are each provided with an electrical charge which is retained in the droplets until the droplets are earthed, and the droplets in one of the sprays being provided with a negative charge and the droplets in the other one of the sprays being provided with a positive charge.

The droplets may be earthed by contact with a plant, an insect or the ground. With a spray which is either negatively or positively charged, the above mentioned circuit completing means will usually be employed.

The droplets may retain their charge, for example, for up to ten seconds from the point of discharge from a spray nozzle.

An embodiment of the invention will now be described solely by way of example and with reference to the accompanying drawings in which:

FIG. 1 shows a person provided with apparatus of the invention in the form of a back pack; and FIG. 2 is a block circuit diagram of the liquid-charging means employed in the back pack shown in FIG. 1.

Referring to FIG. 1, there is shown apparatus 2 for electrically charging water droplets. The apparatus 2 is worn as a back pack 4 by a person 6. The back pack 4 comprises a pair of reservoirs in the form of a pair of tanks 8,10 which each contain water and which are each provided with a control valve. The control valve for each tank 8,10 is operated by a separate power source in the form of a separate battery (not shown). The back pack 4 includes liquid-charging means 12 positioned beneath the tanks 8,10. The tanks 8,10 and the liquid-charging means 12 are all mounted on a flat support board 14.

Water from the spray jets of the tanks 8,10 passes along a pair of hoses 16,18. Each hose 16,18 terminates in a spray nozzle 20,22 respectively. The spray nozzles 20,22 are positioned one above each other in a hand held pistol grip device 24. The lower spray nozzle 22 is for directing a spray of negatively charged water droplets at plants to be stimulated, or at insects to be controlled, or at an insect-containing area. The upper spray nozzle 20 is for directing a spray of positively charged water droplets at the plants, the insects or the insect-containing area. When both sprays of water strike their target they complete an electrical circuit. In the case of plants, the plants receive an electrical current which stimulates their growth as will be described in more detail hereinbelow with reference to the following Examples. In the case of insects, the insects receive an electrical shock which either kills them as is preferred or which persuades them to go elsewhere.

The person 6 is able to operate the apparatus simply by pressing an operator button (not shown) on the pistol grip device. The operator button is such that it is isolated from the high voltage part of the circuit of the apparatus 2. More specifically, the operator button is powered by a 1½ volt battery and depression of the operator button is merely effected to light a bulb. Illumination of the bulb is detected by a pair of spaced apart photo-sensors which, consequent upon detecting the illumination of the bulb, are effective to cause operation of the high voltage part of the apparatus 2, with the result that the water can be sprayed as an electrified spray of a finely dispersed nature or a more solid nature as may be desired.

It will be appreciated that the apparatus 2 uses a completely new approach and a new technique to enable the operator to stimulate plant growth and/or kill insects. Chemical insecticides are just not required so that there is no need to worry about the chemical insecticides being harmful to human life. Chemical fertilisers may not be needed, or they can be used in reduced quantities. Thus the use of chemical fertilisers can be obviated or reduced, again to the benefit of the overall ecology. With the apparatus of the present invention, the high power twin sprays of water use a chopped/-sloped square wave form very high frequency a.c. carrier which supports a high current d.c. voltage on the carrier. If water separation occurs, individual plasmas will form between the droplets enabling relatively large currents to be delivered. Only 2–3 mA of current may be required to kill the insects. Generally, the liquid droplets will be charged to higher levels for insect control than for plant growth stimulation. Insects will usually be subjected to higher electrical energy levels and for shorter periods of time than plants, the plants generally being subjected to lower electrical energy levels for longer periods of time. For insect control, the a.c. component has a high energy level. In the insect control, the water droplets as sprayed have their own d.c. energy and they give a high voltage a.c. discharge on contact with the insects.

Referring now to FIG. 2, the liquid-charging means 12 comprises a trigger or operator button 26, a relay 28, a d.c. to d.c. plasma unit 30, and a transformer 32. The d.c. plasma unit 30 may include a protective overload device in the form of a spark gap arrangement 33. The transformer 32 has a primary winding 34 and a secondary winding 36. One output of the secondary winding 36 is connected to a first water reservoir in the form of a water tank 38. Also present is a second water reservoir in the form of a water tank 40. Each water tank 38,40 is provided with a pump 42,44 respectively. The pumps 42,44 are associated with opto-couplers 46,48 as shown. Each water tank 38, 40 may also be provided with flow measuring means 49 for enabling measurement of the rate of flow of electrically charged liquid.

Also shown in FIG. 2 is a power supply in the form of a battery 50 which is effective to supply power to the tank 40. Another battery 52 is effective to operate the circuit as well as operating the control jet for water leaving the tank 38. The battery 52 supplies power for an oscillator 54 which is effective to give a chopped sawtooth wave. The battery 52 also supplies power for a driver amplifier 56 as shown.

FIG. 2 also shows the hoses 16,18 and their respective spray nozzles 20,22. Since the spray nozzle 20 may be at a very high voltage, insulation 57 is employed. The insulation 57 is also shown in FIG. 1. FIG. 2 further shows that the electronic insecticide apparatus may include time recording means 59 for recording the amount of time that the apparatus has been in operation.

As described above, the electronic insecticide apparatus 2 would normally be used for very short periods, typically of two to three seconds, in order to kill insects. In a modified form of use of the apparatus 2, it is possible to stimulate plant growth. In order that this aspect of the present invention may be fully appreciated, reference will now be made to the following Examples which are given for the purposes of illustration only.

EXAMPLE I

The electronic insecticide apparatus 2 was used to spray the electrically charged water on to one of a pair of Umbrella plants of the species Schefflera. The Umbrella plant is a well known indoor plant.

The Umbrella plant that was sprayed with the electrically charged water was sprayed every three days over a period of nine weeks. A high voltage low d.c. current was employed. After nine weeks, it was found that the Umbrella plant treated with the electrically charged water had grown 135 mm over and above the Umbrella plant that was not treated with the electrically charged water and that was used as a control. The treated Umbrella plant had a larger stem, had rich green leaves and generally looked considerably more healthy than the Umbrella plant that had not been treated with the electrically charged water.

The control Umbrella plant was then treated with the electrically charged water whilst the previously treated Umbrella plant was just left to grow normally without being treated with electrically charged water. After another period of nine weeks during which the previous control plant was treated every three days, it was found that the previous control plant had caught up in growth with the Umbrella plant that was first treated.

Both Umbrella plants were treated with substantially the same amounts of water from over head sprays. When the water was to be electrically charged, this was charged at 20 kV d.c. on a 70 KV square wave a.c. carrier. Both plants were potted in identical composts so that the growth could only be attributed to the electrically charged water.

EXAMPLE II

The electronic insecticide apparatus 2 was modified such that water was sprayed from only one jet 20 as an anode whilst a cathode was implanted in the soil in order to complete an electrical circuit. Two further Umbrella plants were treated as mentioned in Example I with the same results.

EXAMPLE III

An area of wheat was divided approximately in half. The wheat in one area was treated with a fine spray of electrically charged water from a modified form of the apparatus 2. Only a single spray was used and the water droplets in the spray were negatively charged. The treated stalks of wheat were cut and lengths of 30 mm were measured against 30 mm stalk lengths from the untreated wheat. It was found that the treated stalk lengths were heavier, thus proving that good overall growth had been achieved and not just cell expansion for the same relative weight. With the negatively charged droplets, a ground earthing probe which is positively charged was used. Thus all the water droplets leaving the spray jet head are negatively charged and the wheat is seen as electrically positive. The negatively charged water droplets are thus attracted to the plant. Larger droplets contain more electrical energy than fine droplets.

EXAMPLE IV

The procedure of Example III was repeated except that the wheat was treated with a water spray in which the water droplets were positively charged. The treated wheat exhibited faster growth than the non-treated wheat. However, the treated wheat did not grow as fast as the treated wheat in Example III which was treated with a water spray having negatively charged droplets. It was thus concluded that a water spray having negatively charged droplets may give better biostimulation than a water spray having positively charged droplets.

EXAMPLE V

An area of potatoes was divided into two halves. One half of the potato area was treated with a water spray having negatively charged droplets whilst the other half of the potato area was treated with a spray of water that was not electrically charged. Potatoes that were in the area treated with the electrically charged water droplets spray grew faster than those potatoes which were in the untreated area.

In the Journal of Bioelectricity 6 (1) 129-136 (1987) there is an article by D. Krizaj, L. Vodovnik, F. Pohleven and N. Gogala, entitled "Electrical Stimulation; its effects on growth and ion accumulation in Lactus Satival". This article describes the use of weak d.c. electrical current to increase the development of lettuce seedlings. The current is not applied by spraying as in the present invention and also the current is not in the form of a high frequency a.c. carrier supporting a d.c. voltage. Nevertheless, the said article in the Journal of Bioelectricity does provide supportive evidence that the apparatus of the present invention can be used to stimulate plant growth on a consistent and repeatable basis, thus making the apparatus of the present invention suitable for commercial use. For example, with corn, up to a 60% increase in grain weight may be achieved.

It is to be appreciated that the embodiment of the invention described above with reference to the drawings and also the above Examples have been given for illustrative purposes only. Modifications may be effected so that, for example, plants other than those mentioned above may be treated. Also, the electrode implanted in the soil in the above mentioned Example II could be an anode, in which case the water droplets in the spray would be negatively charged. Other ways of earthing the liquid droplets, for example using a laser beam from an aircraft, may be employed. The apparatus 2 may be of a different design than that shown in the drawings so that, for example instead of being in the form of a back pack 4, the apparatus 2 may be attached to a handcart, or to a tractor, or to an airborne vehicle. The apparatus 2 may be constructed as apparatus either for stimulating plant growth or for controlling insects, or the apparatus may be formed as a combined type of apparatus that can be switched at will between either operating mode.

We claim:

1. Apparatus for electrically charging liquid droplets for use in the stimulation of plant growth and/or the control of insects, which apparatus comprises two liquid reservoir means, spray means for spraying at least one spray of liquid from the liquid reservoir means, and electronically operated liquid-charging means for causing the liquid to be electrically charged in such a manner that liquid droplets constituting the spray are able to retain their charge until earthed during use of the apparatus: the electronically operated liquid-charging means including first oscillator means for driving an extreme high tension circuit for affording an extreme high tension voltage output; transformer means having a primary winding driven by the extreme high tension voltage output, the transformer means having a first output on a secondary winding of the transformer means driven by a d.c. inverter means, and a second output on the secondary winding of the transformer means which is connected to one of the liquid reservoir means; an earth connection which is for the liquid-charging means and which is connected to one of the reservoir means; and second oscillator means which operates in parallel with the first oscillator means.

2. Apparatus according to claim 1 in which the liquid-charging means includes a protective overload device.

3. Apparatus according to claim 2 in which the protective overload device is a spark overload gap arrangement.

4. Apparatus according to claim 1 and including two power sources.

5. Apparatus according to claim 1 and including an isolater means for isolating an operator from the liquid-charging means.

6. Apparatus according to claim 5 in which the isolater means is a photo-coupling device.

7. Apparatus according to claim 1 and including flow measuring means for measuring the rate of flow of the electrically charged liquid.

8. Apparatus according to claim 1 and including operating time recording means for recording the amount of time that the apparatus has been in operation.

* * * * *